United States Patent [19]
Miyazaki et al.

[11] Patent Number: 5,282,074
[45] Date of Patent: Jan. 25, 1994

[54] OPTICAL AMPLIFICATION REPEATING SYSTEM

[75] Inventors: Takashi Miyazaki; Haruo Fujiwara, both of Kawasaki, Japan

[73] Assignee: Fujitsu Limited, Kawasaki, Japan

[21] Appl. No.: 11,984

[22] Filed: Feb. 1, 1993

[30] Foreign Application Priority Data

Jan. 31, 1992 [JP] Japan ................... 4-15858

[51] Int. Cl.⁵ ............................. H04B 10/08
[52] U.S. Cl. ................... 359/174; 359/177
[58] Field of Search ............. 359/174, 176, 177

[56] References Cited

U.S. PATENT DOCUMENTS

| | | | |
|---|---|---|---|
| 4,313,224 | 1/1982 | Wakabayashi et al. | 359/176 |
| 4,710,976 | 12/1987 | Wakabayashi et al. | 359/174 |
| 4,971,417 | 11/1990 | Krinsky et al. | 359/177 |
| 5,162,936 | 11/1992 | Taga et al. | 359/177 |

FOREIGN PATENT DOCUMENTS

| | | |
|---|---|---|
| 0410445 | 1/1991 | European Pat. Off. . |
| 0449475 | 10/1991 | European Pat. Off. . |
| 52-146257 | 5/1977 | Japan . |
| 59-215136 | 5/1984 | Japan . |
| 9006640 | 6/1990 | PCT Int'l Appl. . |
| 2242091 | 9/1991 | United Kingdom . |

*Primary Examiner*—Mark Hellner

[57] ABSTRACT

Disclosed is an optical amplification repeating system having at least one repeater disposed in the middle of an optical transmission line connecting two terminal stations in which a light beam output from an optical amplifier is split into at least two split beams, one of the split beams is converted into an electric signal by optical/electrical conversion and the signal-to-noise ratio is detected on the basis of the electric signal. With such arrangement, the signal-to-noise ratio in the repeater can be measured in an in-service state, i.e., while the system is in operation.

21 Claims, 10 Drawing Sheets

OPTICAL AMPLIFICATION REPEATING SYSTEM

BACKGROUND OF THE INVENTION

1. Field of the Invention

The present invention relates to an optical amplification repeating system having at least one repeater disposed in the middle of an optical transmission line connecting two terminal stations and, more particularly, to such a system that allows the signal-to-noise ratio in the repeater to be measured in an in-service state of the system.

2. Description of the Related Art

Such an art is known that achieves optical amplification of a signal light by supplying the signal light and pumping light with predetermined wavelengths to a doped fiber, i.e., a fiber doped with a rare earth element such as erbium. Recently, there have been developed optical amplifier repeaters on the principle of such optical amplification. In an optical amplification repeating system with such repeaters inserted therein in multiple stages, it is effective to measure the signal-to-noise ratio (SNR) in each of the repeaters in locating a point of trouble. However, there has been developed no such SNR measuring circuit that can be easily mounted in a repeater. Therefore, it has been strongly desired to make it possible to measure the SNR in each optical amplifying repeater in an in-service state, i.e., while the system is in operation.

SUMMARY OF THE INVENTION

An object of the present invention is to provide an optical amplification repeating system allowing the SNR in the optical amplifying repeater in the system to be measured in an in-service state of the system.

Another object of the present invention is to provide an optical amplification repeating system allowing a terminal station to easily obtain the SNR that has been measured in the optical amplifying repeater.

According to the present invention, there is provided an optical amplification repeating system having at least one optical amplifying repeater disposed in the middle of an optical transmission line connecting a first terminal station and a second terminal station comprising: optical amplification means for amplifying an optical signal supplied thereto through the optical transmission line; beam splitting means for splitting an output light beam of the optical amplification means into at least two split beams; optical/electrical conversion means for converting at least one of the split beams into an electric signal; SNR detection means for detecting the signal-to-noise ratio according to the electric signal; and monitor and control means performing predetermined controlling operations upon receipt of a supervisory control signal superposed on the main signal of the optical signal; wherein the other of the split beams is transmitted over the optical transmission line.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

An embodiment of the present invention will be described below in detail with reference to the accompanying drawings.

Figure 1:
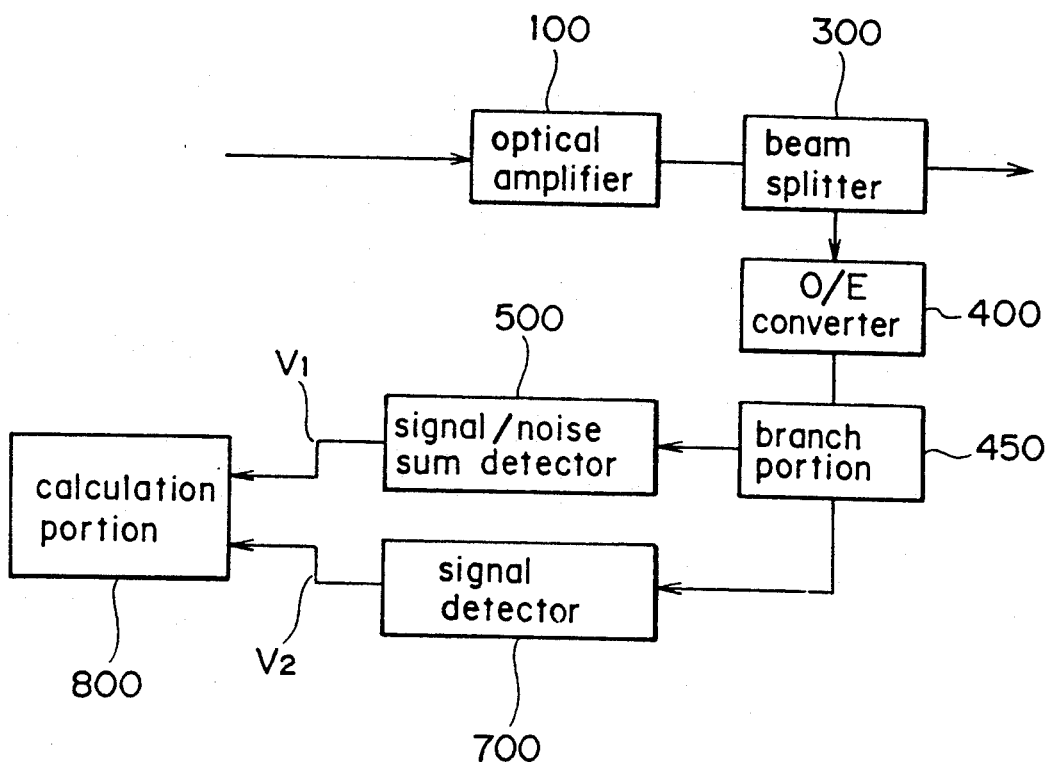
FIG. 1 is a block diagram of a system showing a first embodiment of the present invention.

FIG. 1 is a block diagram of a system showing a first embodiment of the present invention. An optical amplifier portion 100 amplifies an optical signal supplied from a terminal station, not shown, through an optical transmission line and outputs the amplified optical signal. A beam splitter portion 300 splits the light beam supplied from the optical amplifier portion 100 into two beams and transmits one of the split beams over the optical transmission line to the other terminal station than the above terminal station, while it supplies the other of the split beams to an O/E converter portion 400. The O/E converter portion 400 converts the supplied light beam into an electric signal and supplies this signal to the branch portion 450. The electric signal supplied to the branch portion 450 is divided into a first and a second branch signal. The first branch signal is supplied to a signal/noise sum detector portion 500 and the second branch signal is supplied to a signal detector portion 700. The signal/noise sum detector portion 500 outputs a voltage $V_1$ corresponding to the sum of the main signal component and the noise component included in the split beam. The signal detector portion 700 outputs a voltage $V_2$ corresponding to the main signal component included in the split beam. The voltages $V_1$ and $V_2$ are supplied to a calculation portion 800. The calculation portion 800 performs a predetermined set of calculation using the voltages $V_1$ and $V_2$ to thereby obtain the SNR.

Figure 2:
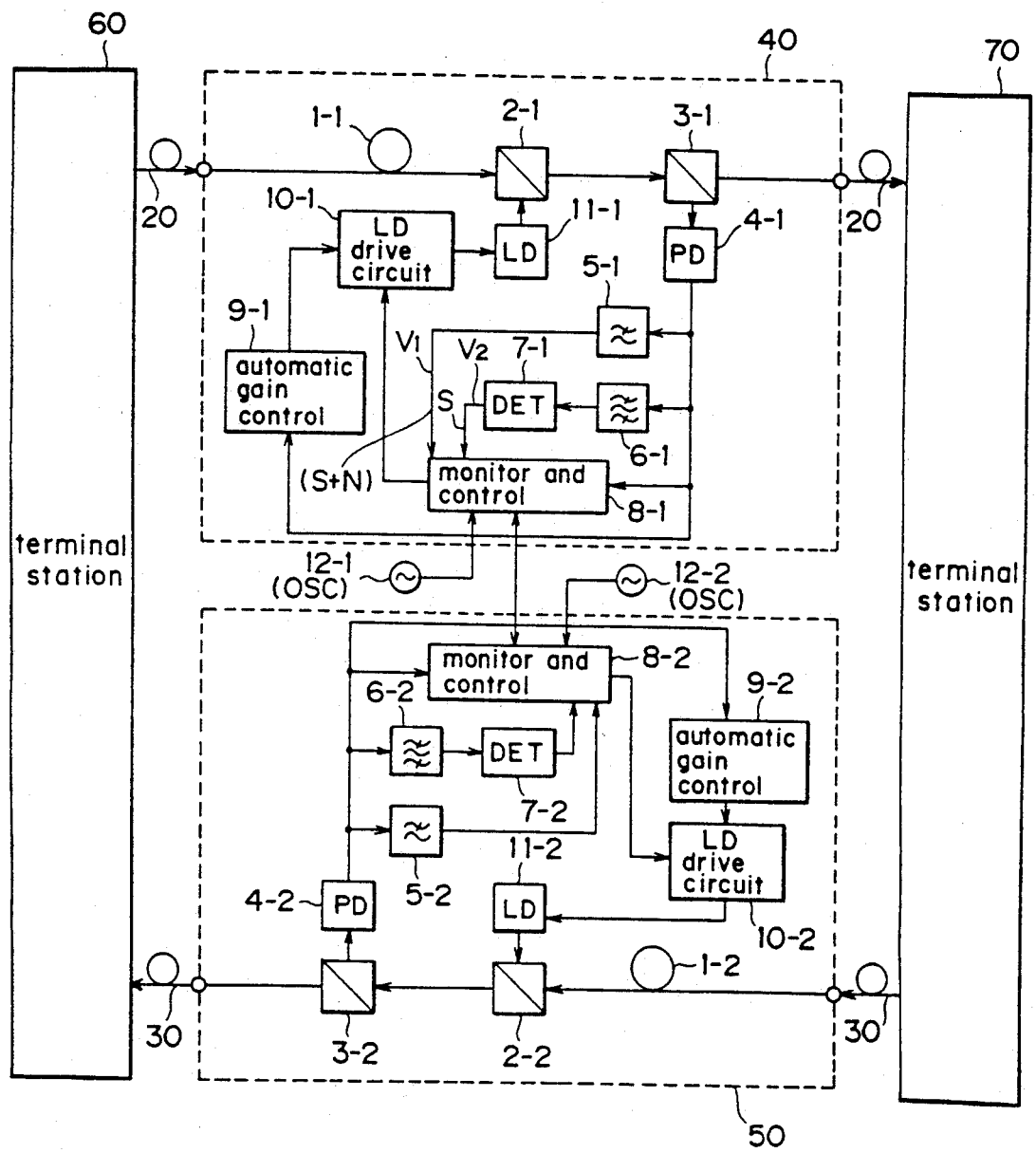
FIG. 2 is a block diagram showing a particular example of the system shown in FIG. 1.

FIG. 2 is a block diagram of a system showing a particular example of the first embodiment of the present invention. This system has an up optical transmission line 20 and a down optical transmission line 30 connecting a terminal station 60 and a terminal station 70. In the middle of the up optical transmission line 20, there is disposed a repeater circuit 40, and in the middle of the down optical transmission line 30, there is disposed a repeater circuit 50 independently of the repeater circuit 40. The repeater circuits 40 and 50 are incorporated in an optical amplifying repeater. Here, "up" refers to the direction from the terminal station 60 to the terminal station 70 and "down" refers to the direction from the terminal station 70 to the terminal station 60.

An optical signal transmitted from the terminal station 60 over the up optical transmission line 20 is supplied to a doped fiber 1-1. The doped fiber at least has its core doped with a rare earth element such as Er (erbium). The doped fiber 1-1 is stimulated by pumping light supplied from a laser diode 11-1 through an optical coupler 2-1. When an optical signal is supplied to the doped fiber 1-1 in the described state, the optical signal is amplified. When the element with which the doped fiber 1-1 is doped is Er, the wavelength of the signal light to be amplified may for example be 1.55 micrometer and the wavelength of the pumping light may for example be 1.48 micrometer. By virtue of the difference in wavelength, optical coupling in the optical coupler 2-1 can be achieved.

The optical signal amplified in the doped fiber 1-1 is supplied to a beam splitter 3-1 through the optical coupler 2-1. Most of the optical signal supplied thereto is transmitted over the optical transmission line 20 and a portion of the same is separated to be supplied to a photodiode 4-1. The output signal of the photodiode 4-1 is divided into those supplied to a low-pass filter 5-1, a bandpass filter 6-1, a monitor and control portion 8-1, and an automatic gain control circuit 9-1. By having the output signal of the photodiode 4-1 passed through the low-pass filter 5-1, a DC voltage $V_1$ proportional to the average value of the sum (S+N) of the signal component and the noise component of the optical input is obtained. The DC voltage $V_1$ is supplied to the monitor and control portion 8-1.

The optical signal transmitted from the terminal station 60 is provided with specific amplitude modulation for automatic output level control of the repeater. Representing the modulation frequency by f1, by having the output signal of the photodiode 4-1 passed through the bandpass filter 6-1 whose center frequency is $f_1$ and, further, through an envelope detector 7-1, a DC voltage $V_2$ proportional to the signal component (S) is obtained. The DC voltage $V_2$ is supplied to the monitor and control portion 8-1.

In the monitor and control portion 8-1, the SNR can be obtained according to the following expression.

$$S/N = b_1 V_2/(a_1 V_1 - b_1 V_2).$$

where $a_1$ and $b_1$ are constants determined by such factors as conversion efficiency, attenuation, and modulation factor of each circuit.

Otherwise, the above calculation may be performed by a computer in the terminal station 60 to decrease the circuit scale of the monitor and control portion 8-1. To achieve this, the DC voltages $V_1$ and $V_2$ are converted to digital values by analog/digital converters (not shown). The converted digital signals are supplied to a monitor and control portion 8-2 provided for the down optical transmission line 30. In the monitor and control portion 8-2, a sinusoidal wave output from an oscillator 12-2 generating a sinusoidal wave at 10 KHz, for example, is modulated by the above digital signals and the thus obtained modulated signal is supplied to an LD drive circuit 10-2.

Meanwhile, an optical signal transmitted over the down optical transmission line 30 is supplied to a doped fiber 1-2 stimulated by the pumping light from a laser diode 11-2 to be optically amplified. In order to maintain the output light level from the doped fiber 1-2, the gain in the doped fiber 1-2 is automatically controlled by an automatic gain control circuit 9-2. The output of the automatic gain control circuit 9-2 corresponding to the DC component of the driving current of the laser diode 11-2 is supplied to the LD drive circuit 10-2.

The LD drive circuit 10-2 drives the laser diode 11-2 with the above described modulated signal as the output of the monitor and control portion 8-2 (corresponding to the AC component of the driving current of the laser diode 11-2) and the output of the automatic gain control circuit 9-2 (corresponding to the DC component of the driving current of the laser diode 11-2). The output light (pumping light) of the laser diode 11-2 modulated by the modulated signal is supplied to the doped fiber 1-2 and, thereby, the gain of the optical amplification is modulated. Thus, the optical signal input from the down optical transmission line 30 is amplified superposed with the above modulated signal and transmitted to the terminal station 60 through the down optical transmission line 30. The terminal station 60 performs the above calculation to obtain the SNR.

Since the parts in the repeater circuits 40 and 50 corresponding to each other operate in the same manner, the description of the counterparts has been omitted. As the detector circuit in the envelope detector 7-1, a circuit detecting an average value or detecting an effective value after performing half-wave rectification of the input signal, or any other circuit similarly detecting the amplitude may be used.

The reason why the output signal of the photodiode 4-1 is directly supplied to the monitor and control portion 8-1 of the repeater circuit 40 is given as under. A bandpass filter (not shown) incorporated in the monitor and control portion 8-1 extracts a subcarrier at for example 10 MHz modulated by a supervisory control signal. The monitor and control portion 8-1 demodulates the subcarrier to thereby reproduce the supervisory control signal transmitted from the terminal station 60. According to the supervisory control signal, the same performs monitoring and controlling operations such as monitoring of the input/output level of the repeater, monitoring of the driving current of the laser diode 11-1 for stimulation, monitoring of the temperature, switching of the laser diode 11-1 in use to a backup, not shown, and optical loopback. In addition, the amplitude (intensity) modulation frequency of the main signal is 2 GHz, for example.

Figure 3:
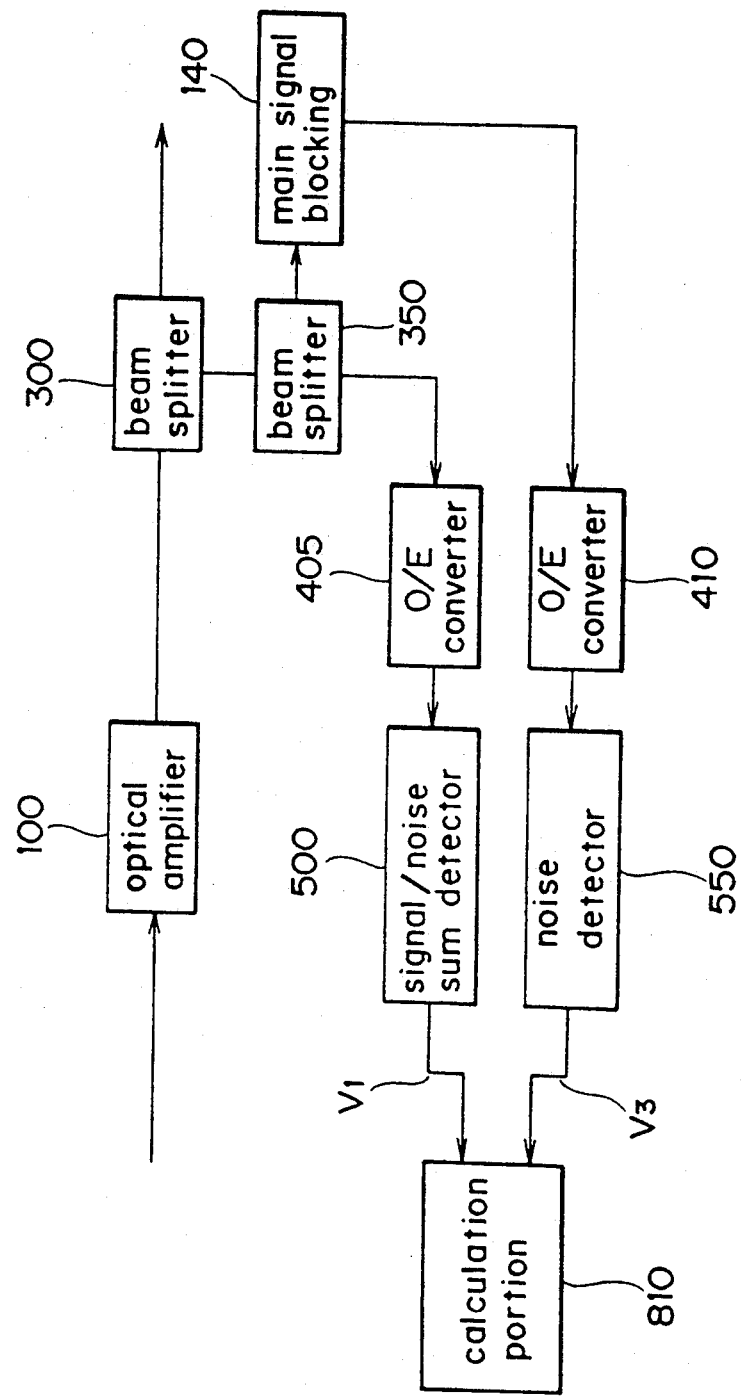
FIG. 3 is a block diagram of a system showing a second embodiment of the present invention.

FIG. 3 is a block diagram of a system showing a second embodiment of the present invention. An optical amplifier portion 100 amplifies an optical signal supplied from a terminal station, not shown, through an optical transmission line and outputs the amplified signal. A beam splitter portion 300 splits the light beam supplied from the optical amplifier portion 100 into two beams and transmits one of the split beams over the optical transmission line to the terminal station other than the above terminal station, while it supplies the other of the split beams to another beam splitter portion 350. The beam splitter portion 350 splits the supplied beam into two beams and supplies one of the split beams to an O/E converter portion 405 and supplies the other of the split beams to a main signal blocking portion 140. The main signal blocking portion 140 outputs the light beam supplied thereto with the main signal component included therein blocked and supplies the output to an O/E converter portion 410. The O/E converter portion 405 converts the beam supplied thereto into a first electric signal and supplies this signal to a signal/noise sum detector portion 500. The O/E converter portion 410 converts the supplied light beam into a second electric signal and supplies this signal to a noise detector portion 550. The signal/noise sum detector portion 500 outputs a voltage $V_1$ corresponding to the sum of the main signal component and the noise component included in the split beam. The noise detector portion 550 outputs a voltage $V_3$ corresponding to the noise component included in the split beam. The voltages $V_1$ and $V_3$ are supplied to a calculation portion 810. The calculation portion 810 performs a predetermined set of calculation using the voltages $V_1$ and $V_3$ to thereby obtain the SNR.

Figure 4:
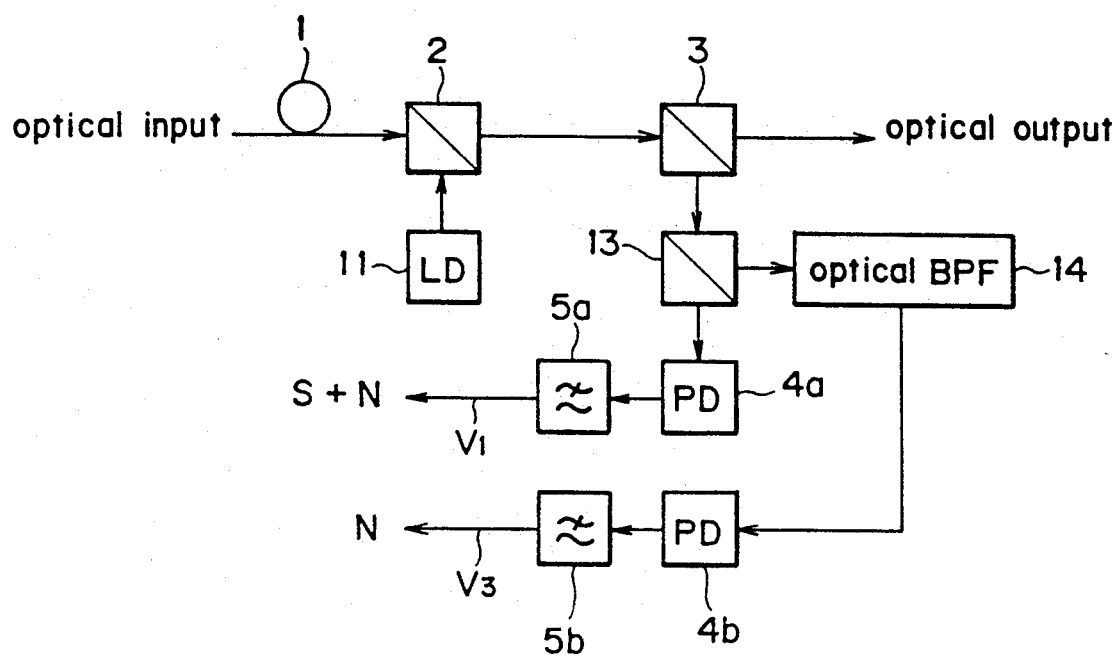
FIG. 4 is a block diagram showing a particular example of the system shown in FIG. 3.

FIG. 4 is a block diagram of a system showing a particular example of the second embodiment shown in FIG. 3. An optical signal supplied for example from the up optical transmission line is optically amplified in the doped fiber 1 stimulated by output light from a laser diode 11 and then supplied to a beam splitter 3 through an optical coupler 2. One of the split beams by the beam splitter 3 is further split by another beam splitter 13 and, thereby, two split beams are supplied to a photodiode 4a and an optical bandpass filter 14. By having the output signal of the photodiode 4a passed through a low-pass filter 5a, a DC voltage $V_1$ proportional to the average value of the sum of the signal component and the noise component of the optical input is obtained the same as in the above described first embodiment. The DC voltage $V_1$ is supplied to a monitor and control portion (not shown).

Figure 5:
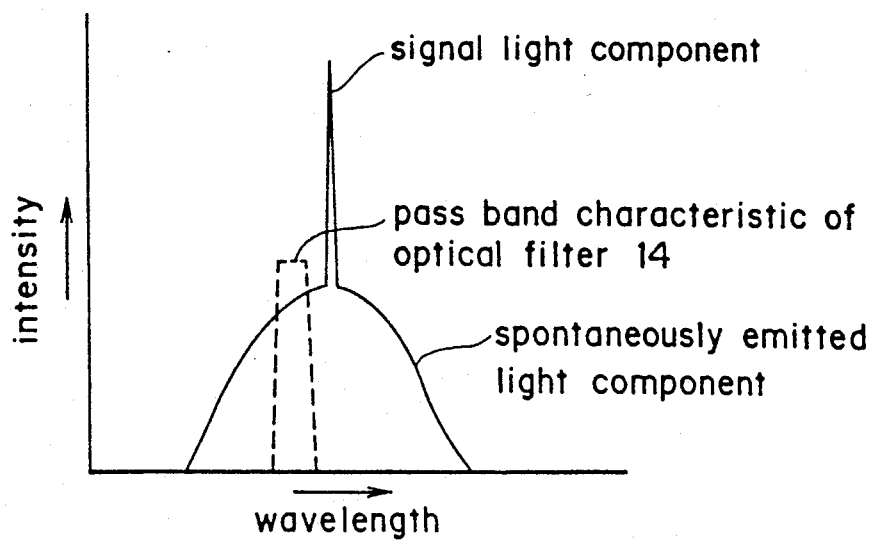
FIG. 5 is a diagram showing a spectrum of an amplified beam of light.

FIG. 5 is a diagram showing an example of a spectrum in optical amplification. The noise produced in direct optical amplification is chiefly caused by spontaneously emitted light generated in the doped fiber. While the signal light component corresponding to the amplified optical signal has a very narrow band, the spontaneously emitted light component has a wide band. Therefore, by setting the pass band of the optical bandpass filter 14 in FIG. 4 to a suitable wavelength band close to the wavelength of the signal light, the DC voltage $V_3$ proportional to the noise component (N) can be obtained. The DC voltage $V_3$ is supplied to a monitor and control portion.

In the monitor and control portion, the SNR can be obtained by using the following expression.

$$S/N = (b_2 V_1 - a_2 V_3)/a_2 V_3,$$

where $a_2$ and $b_2$ are constants determined by such factors as conversion efficiency, attenuation, and modulation factor of each circuit. Otherwise, the same as in the above described embodiment, it may be arranged, to decrease the circuit scale of the monitor and conrol portion, such that the calculation is performed by a computer in a terminal station. Instead of the optical bandpass filter 14, an optical band-stop filter for attenuating the signal light component amplified by the doped fiber 1 may be used. Such optical filters can be produced using a dielectric multilayer film.

Figure 6:
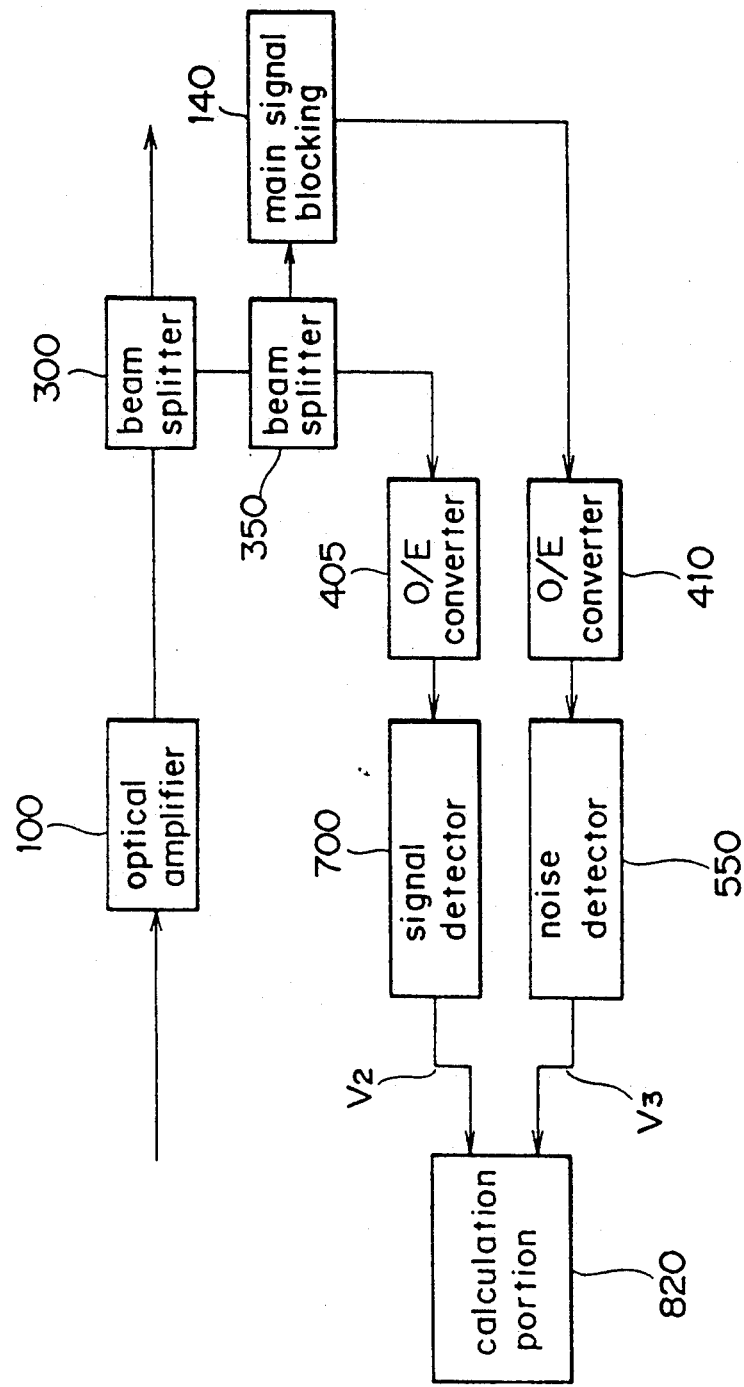
FIG. 6 is a block diagram of a system showing a third embodiment of the present invention.

FIG. 6 is a block diagram of a system showing a third embodiment of the present invention. The points in which this embodiment differs from the second embodiment in FIG. 3 are that a signal detector portion 700 is provided in place of the signal/noise sum detector portion 500 and that a calculation portion 820 performs a predetermined set of calculation using a voltage $V_2$ from the signal detector portion 700 and a voltage $V_3$ from a noise detector portion 550 to obtain the SNR.

Figure 7:
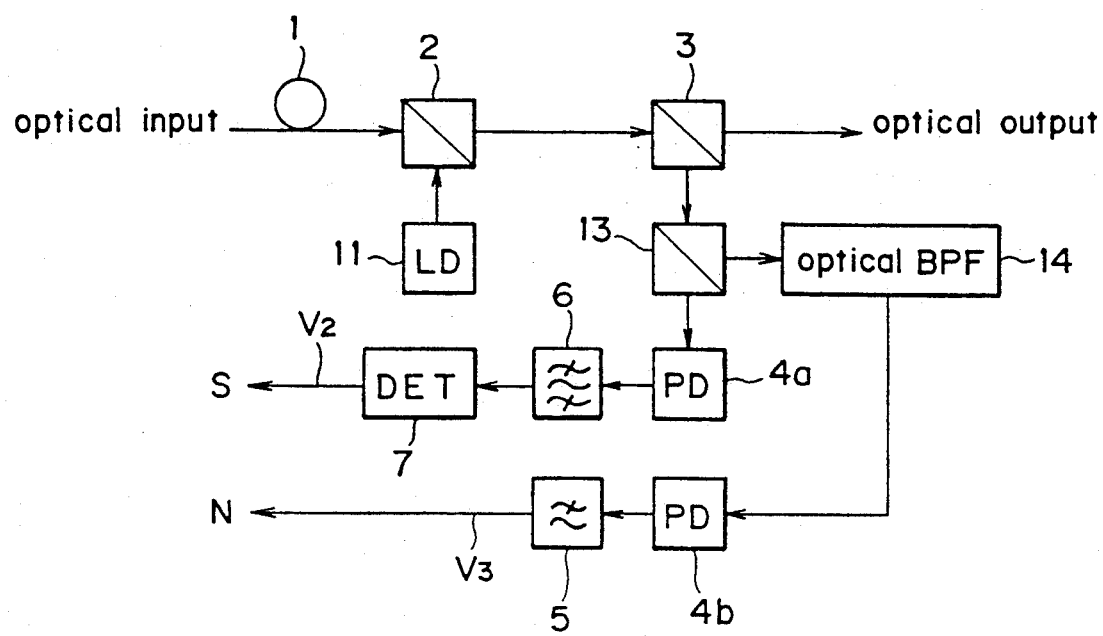
FIG. 7 is a block diagram showing a particular example of the system shown in FIG. 6.

FIG. 7 is a block diagram of a system showing a particular example of the third embodiment in FIG. 6. In the present system, the method for detecting the signal component (S) is the same as that in the above described first embodiment. Further, the method for detecting the noise component (N) is the same as that in the above described second embodiment. The SNR is obtained according to the following expression.

$$S/N = a_3 V_2 / b_3 V_3,$$

where $a_3$ and $b_3$ are constants determined by such factors as conversion efficiency, attenuation, and modulation factor of each circuit.

Figure 8:
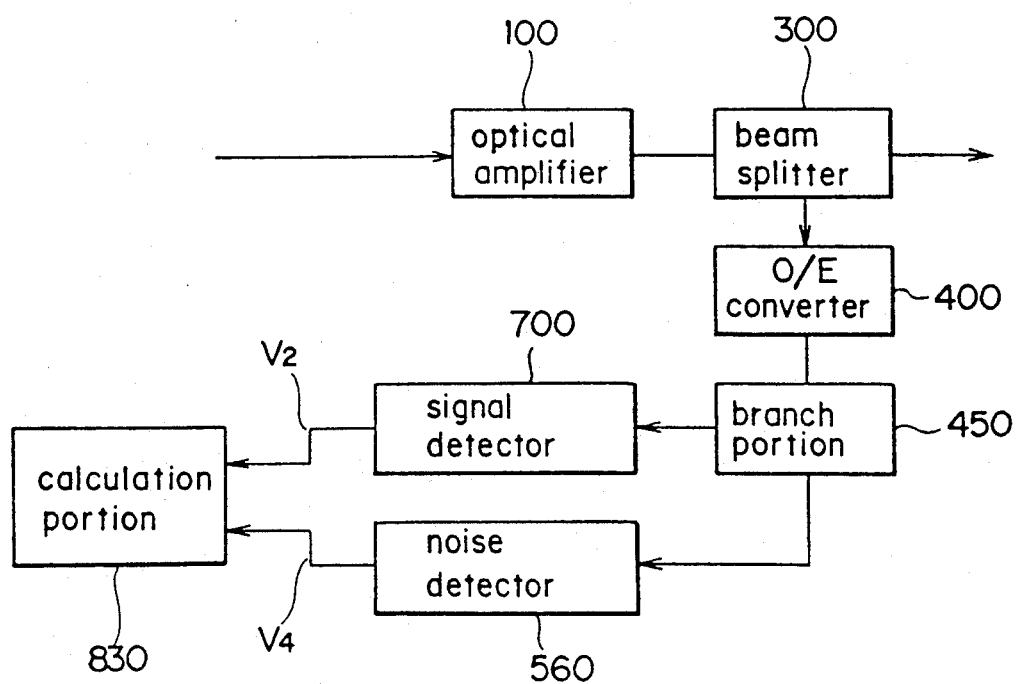
FIG. 8 is a block diagram of a system showing a fourth embodiment of the present invention.

FIG. 8 is a block diagram of a system showing a fourth embodiment of the present invention. This system is applicable to coherent optical transmission. More specifically, the main signal of the optical signal is angle modulated (phase modulated or frequency modulated) and a supervisory control signal component is superposed on the main signal by amplitude modulation (intensity modulation). This embodiment is characterized by the fact that a first and a second branch signal branching out from a branch portion 450 are supplied to a signal detector portion 700 and a noise detector portion 560, respectively. The signal detector portion 700 outputs a voltage $V_2$ corresponding to the main signal component included in the split beam. The noise detector portion 560 blocks the main signal component included in the split beam and outputs a voltage $V_4$ corresponding to the noise component included in the split beam. The voltages $V_2$ ad $V_4$ are supplied to a calculation portion 830. The calculation portion 830 performs a predetermined set of calculation using the voltages $V_2$ ad $V_4$ to thereby obtain the SNR.

Figure 9:
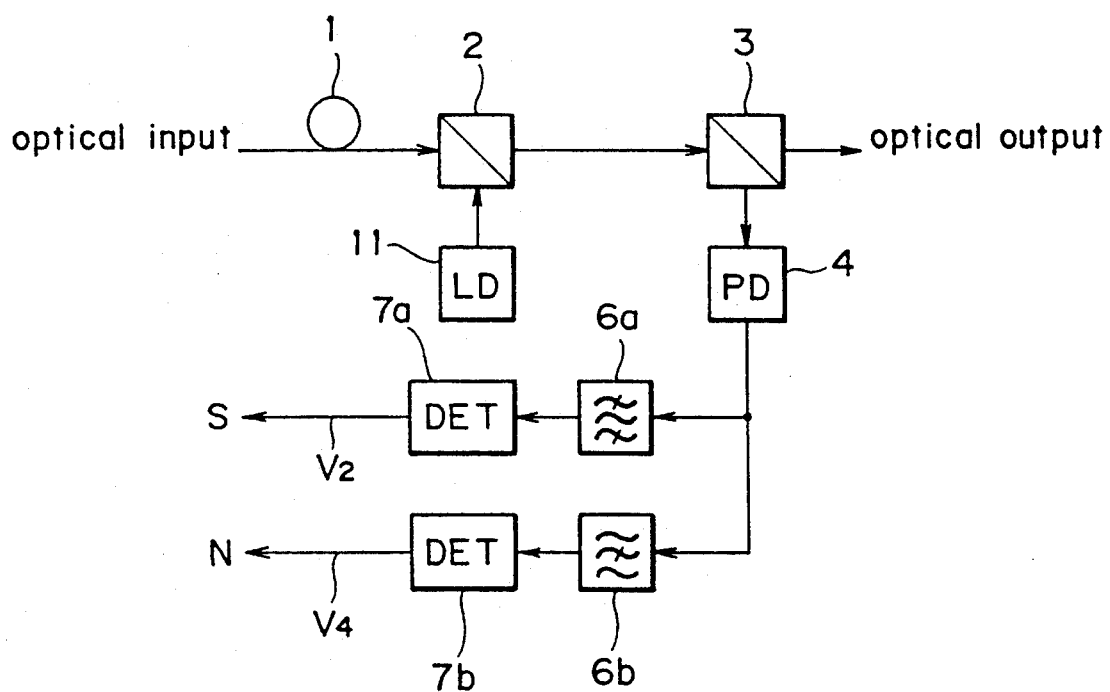
FIG. 9 is a block diagram showing a particular example of the system shown in FIG. 8.

FIG. 9 is a block diagram showing a particular example of the fourth embodiment shown in FIG. 8. By having a portion of the output signal of the photodiode 4 passed through a bandpass filter 6a and an envelope detector 7a in the order named, a DC voltage $V_2$ proportional to the signal component (S) is obtained. Further, by having another portion of the output signal of the photodiode 4 passed through a band-stop filter 6b and an envelope detector 7b in the order named, a DC voltage $V_4$ proportional to the noise component (N) is obtained. The bandpass filter 7a allows to pass therethrough a signal for automatic output level control for the optical amplifying repeater having the frequency $f_1$ for the amplitude modulation, while the band-stop filter 6b attenuates the signal with the frequency $f_1$. The SNR is obtained from the following expression.

$$S/N = a_4 V_2 / b_4 V_4,$$

where $a_4$ and $b_4$ are constants determined by such factors as conversion efficiency, attenuation, and modulation factor of each circuit.

The fourth embodiment is applicable only to a coherent system in which intensity modulation is not used but phase modulation, frequency modulation, or the like is used in the modulation method of the main signal. This is because, in the case where intensity modulation is performed, the DC voltage $V_4$ corresponding to the noise component (N) comes to include the main signal component. Incidentally, the noise component (N) can be obtained by using a low-pass filter in place of the band-stop filter 6b and a peak-to-peak detector circuit in place of the envelope detector circuit 7b.

Figure 10:
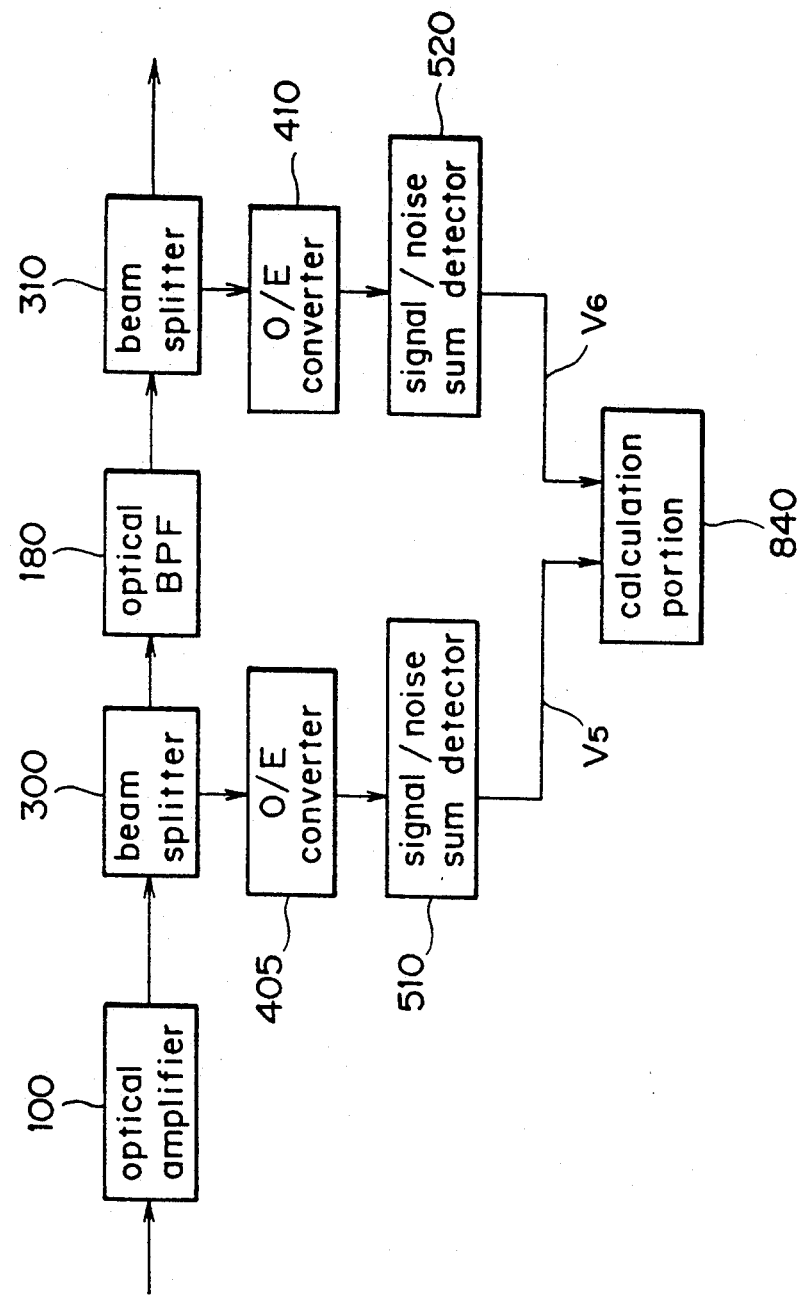
FIG. 10 is a block diagram of a system showing a fifth embodiment of the present invention.

FIG. 10 is a block diagram of a system showing a fifth embodiment of the present invention. An optical amplifier portion 100 amplifies an optical signal supplied from a terminal station, not shown, through an optical transmission line and supplies the amplified signal to a beam splitter portion 300. The beam splitter portion 300 splits the light beam supplied thereto into a first and a second split beam. The first split beam is supplied to an O/E converter portion 405 and the second split beam is supplied to a beam splitter portion 310 through an optical bandpass filter 180. The beam splitter portion 310 splits the supplied light beam into a third and a fourth split beam. The third split beam is supplied to an O/E converter portion 410 and the fourth split beam is transmitted over the optical transmission line. A signal/noise sum detector portion 510 which is supplied with the output signal of the O/E converter portion 405 outputs a voltage $V_5$ corresponding to the sum of the main signal component and the noise component included in the first split beam. A signal/noise sum detector portion 520 which is supplied with the output signal of the O/E converter portion 410 outputs a voltage $V_6$ corresponding to the sum of the main signal component and the noise component included in the third split beam. The voltages $V_5$ and $V_6$ are supplied to a calculation portion 840. The calculation portion 840 performs a predetermined set of calculation using the voltages $V_5$ and $V_6$ to thereby obtain the SNR.

Figure 11:
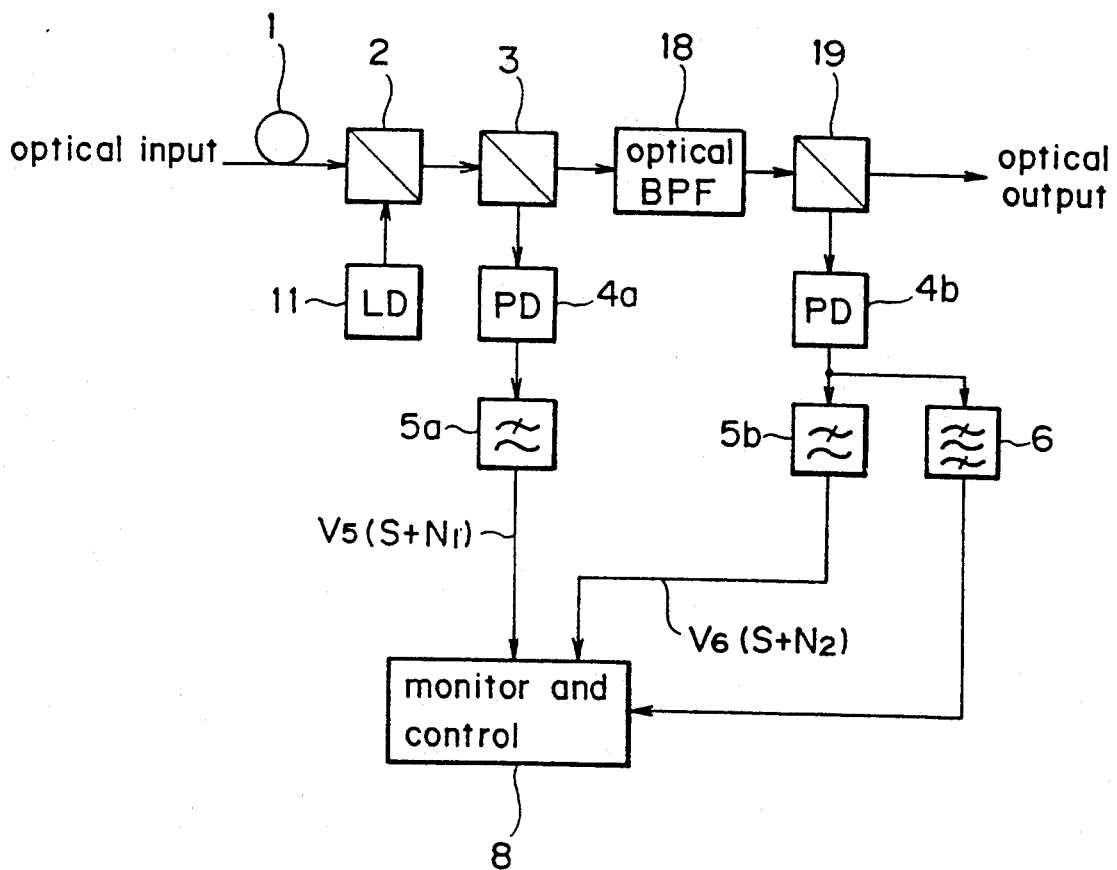
FIG. 11 is a block diagram showing a particular example of the system shown in FIG. 10.

FIG. 11 is a block diagram of a system showing a particular example of the fifth embodiment in FIG. 10. In an optical amplifier repeater, in general, to avoid accumulation of spontaneously emitted light beams as a result of multistage repeating, there is provided an optical bandpass filter 18 as shown in FIG. 11 having the signal light wavelength as its center wavelength. By having the output light of the doped fiber 1 passed through the optical bandpass filter 18, the spontaneously emitted light components are suppressed. Accordingly, by obtaining the average values of the optical signal at the front and at the rear of the optical bandpass filter 18, the SNR can be obtained. More detailed expression of this will be given below.

A portion of the amplified light beam in a doped fiber 1 is extracted by a beam splitter 3 and this light beam is converted into an electric signal by a photodiode 4a. By having this electric signal passed through a low-pass filter 5a, a DC voltage $V_5$ proportional to the average value of the sum of the signal component and the noise component $(S+N_1)$ is obtained. The DC voltage $V_5$ is supplied to a monitor and control portion 8. Meanwhile, a portion of the output light beam of an optical bandpass filter 18 is extracted by a beam splitter 19 and this light beam is converted into an electric signal by a photodiode 4b. By having this electric signal passed through a low-pass filter 5b, a DC voltage $V_6$ proportional to the light component with the component of the spontaneously emitted light suppressed by a predetermined amount $(S+N_2)$ is obtained. The DC voltage $V_6$ is supplied to the monitor and control portion 8. Further, by having the output signal of the photodiode 4b passed through a bandpass filter 6, the supervisory control signal (order for monitoring) transmitted from the terminal station is obtained and this signal is also supplied to the monitor and control portion 8. The SNR is obtained in the monitor and control portion 8 according to the following expression.

$$S/N = f(V_5, V_6),$$

where the function $f(V_5, V_6)$ is determined according to the characteristics of the optical bandpass filter 18. Therefore, by obtaining the function in advance, the SNR can be obtained by calculation. Otherwise, to decrease the circuit scale of the monitor and control portion 8, the above calculation may be arranged to be performed by a computer in the terminal station.

Figure 12:
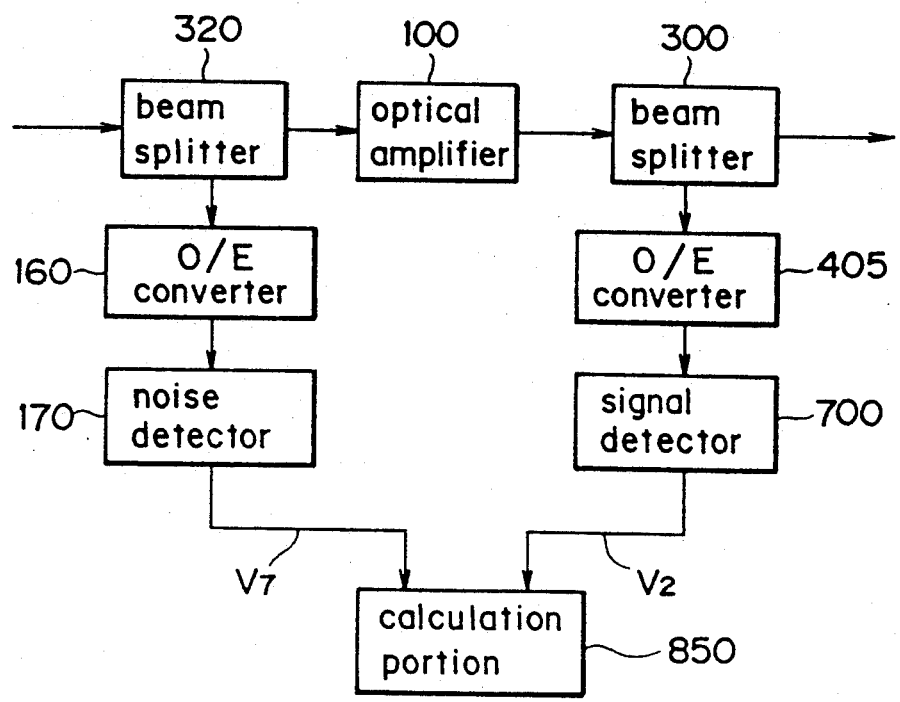
FIG. 12 is a block diagram of a system showing a sixth embodiment of the present invention.

FIG. 12 is a block diagram of a system showing a sixth embodiment of the present invention. An optical signal transmitted from a terminal station, not shown, through an optical transmission line is supplied to an optical amplifier portion 100 through a beam splitter portion 320. The beam of light amplified in the optical amplifier portion 100 is supplied to a beam splitter portion 300 and split into a first and a second split beam. The first split beam is supplied to an O/E converter portion 405 and the second split beam is transmitted over the optical transmission line. The beam splitter portion 320 is for splitting the spontaneously emitted light beam generated in the doped fiber included in the optical amplifier portion 100. The spontaneously emitted light beam is supplied to an O/E converter portion 160. A noise detector portion 170 which is supplied with the output signal of the O/E converter portion 160 outputs a voltage $V_7$ corresponding to the noise component included in the spontaneously emitted light beam. A signal detector portion 700 which is supplied with the output signal of the O/E converter portion 405 outputs a voltage $V_2$ corresponding to the main signal component included in the first split beam. The voltages $V_2$ and $V_7$ are supplied to a calculation portion 850. The calculation portion 850 performs a predetermined set of calculation using the voltages $V_2$ and $V_7$ to thereby obtain the SNR.

Figure 13:
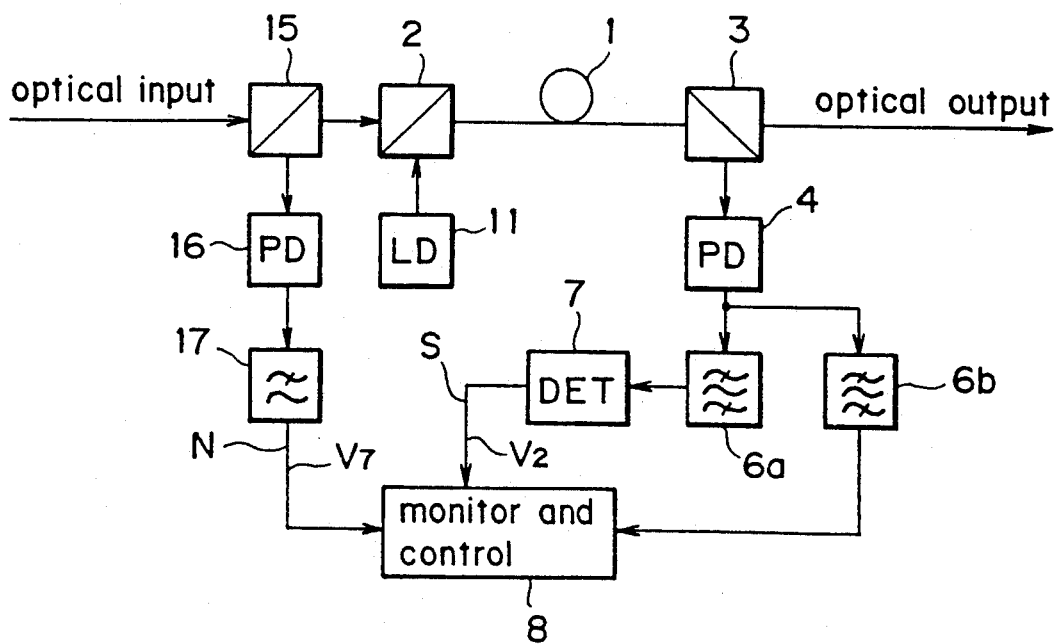
FIG. 13 is a block diagram showing a particular example of the system shown in FIG. 12.

FIG. 13 is a block diagram of a system showing a particular example of the sixth embodiment shown in FIG. 12. Since the spontaneously emitted light is split by an optical coupler 15 on the side toward the input side of the doped fiber 1, an optical coupler 2 for introducing the pumping light from a laser diode 11 into the doped fiber 1 is disposed between the optical coupler 15 and the doped fiber 1. The detection of the signal component (S) is performed in the same way as in the first embodiment. A portion of light beam amplified in the doped fiber 1 is extracted by the beam splitter 3 and supplied to a photodiode 4. By having the output signal of the photodiode 4 passed through a bandpass filter 6a and an envelope detector 7, a DC voltage $V_2$ proportional to the signal component (S) is obtained. The DC voltage $V_2$ is supplied to a monitor and control portion 8. Further, by having the output signal of the photodiode 4 passed through the bandpass filter 6b, a supervisory control signal (order for monitoring) transmitted from the terminal station can be obtained and this signal is also supplied to the monitor and control portion 8.

The spontaneously emitted light extracted by the optical coupler 15 is supplied to a photodiode 16. By having the output of the photodiode 16 passed through a low-pass filter 17, a DC voltage $V_7$ proportional to the noise component (N) is obtained. The DC voltage $V_7$ is supplied to the monitor and control portion 8. The monitor and control portion 8 obtains the SNR according to the following expression.

$$S/N = a_5 V_2 / b_5 V_7$$

where $a_5$ and $b_5$ are constants determined by such factors as conversion efficiency, attenuation, and modulation factor of each circuit. The reason why the spontaneously emitted light is extracted on the side toward the input side of the doped fiber 1 is this. That is, although the spontaneously emitted light is emitted both on the input side and on the output side of the doped fiber 1, it is impossible to detect only the spontaneously emitted light on the output side because the amplified signal light is also emitted on the output side.

According to the present invention as described above, by measuring the signal-to-noise ratio, it becomes possible for example to correctly locate the point of trouble in a system including a plurality of optical amplifying repeaters. Further, it becomes possible to reliably measure the signal-to-noise ratio in a repeater by additionally providing it with a measurement circuit of a small circuit scale, small mounting space, low power consumption, and low cost. Further, it becomes possible to measure the signal-to-noise ratio in an in-service state of the system, and therefore valuable data for maintenance and operation of a system including optical amplifying repeaters can be obtained.

The above described details of the preferred embodiments have been given by way of illustration only and not limitative of the present invention. For example, the present invention is applicable to a system having a plurality of optical amplifying repeaters disposed between a first and a second terminal station. The scope of the invention is defined by the appended claims and all changes and modifications as fall within the equivalence of the scope of the claims are therefore to be embraced by the invention.

What is claimed is:

1. An optical amplification repeating system having at least one optical amplifying repeater disposed in the middle of an optical transmission line connecting a first terminal station and a second terminal station comprising:

optical amplification means for amplifying an optical signal supplied thereto through said optical transmission line;

beam splitting means for splitting an output light beam of said optical amplification means into at least two split beams;

optical/electrical conversion means for converting at least one of said split beams into an electrical signal;

SNR detection means for detecting a signal-to-noise ratio according to said electric signal; and monitor and control means performing predetermined controlling operations upon receipt of a supervisory control signal superposed on a main signal of said optical signal; wherein the other of said split beams is transmitted over said optical transmission line, said beam splitting means includes a beam splitter portion for splitting the amplified light beam by said optical amplification means into a first and a second split beam, said first split beam being supplied to said optical/electrical conversion means and said second split beam being transmitted over said optical transmission line, and said SNR detection means includes a branch portion for dividing said electric signal from said optical-/electrical conversion means into a first and a second branch signal, a first detector portion supplied with said first branch signal for outputting a voltage $V_1$ corresponding to the sum of a main signal component and a noise component included in said first split beam, a second detector portion supplied with said second branch signal for outputting a voltage $V_2$ corresponding to the main signal component included in said first split beam, and a calculation portion for calculating said signal-to-noise ratio according to $$SNR = b_1 V_2 / (a_1 V_1 - b_1 V_2)$$

using said voltages $V_1$ and $V_2$ and predetermined constants $a_1$ and $b_1$.

2. An optical amplification repeating system according to claim 1, wherein said first detector portion includes a low-pass filter supplied with said first branch signal, and said second detector portion includes a bandpass filter supplied with said second branch signal and an envelope detector supplied with the output of said bandpass filter.

3. An optical amplification repeating system according to claim 2, wherein said bandpass filter allows to pass therethrough a signal with a frequency of amplitude modulation for automatic output level control for said optical amplifying repeater.

4. An optical amplification repeating system having at least one optical amplifying repeater disposed in the middle of an optical transmission line connecting a first terminal station and a second terminal station comprising:

optical amplification means for amplifying an optical signal supplied thereto through said optical transmission line;

beam splitting means for splitting an output light beam of said optical amplification means into at least two split beams;

optical/electrical conversion means for converting at least one of said split beams into an electric signal;

SNR detection means for detecting a signal-to-noise ratio according to said electric signal;

monitor and control means performing predetermined controlling operations upon receipt of a supervisory control signal superposed on a main signal of said optical signal;

the other of said split beams being transmitted over said optical transmission line, said amplification means including a doped fiber whose core is doped with a rare earth element connected with said optical transmission line, a pumping light source for outputting pumping light, and means for coupling said pumping light with said optical signal and introducing coupled waves into said doped fiber, said beam splitting means including a first beam splitter portion for splitting the amplified light beam by said optical amplification means into a first and a second split beam and a second beam splitter portion for splitting said first split beam into a third and a fourth split beam, said second split beam being transmitted over said optical transmission line; and a main signal blocking portion supplied with said fourth split beam for outputting said fourth split beam with a main signal component included therein blocked, wherein said optical/electrical conversion means includes a first optical/electrical converter portion for converting said third split light into a first electric signal and a second optical/electrical converter portion for converting the light beam supplied from said main signal blocking portion into a second electric signal, and wherein said SNR detection means includes a first detector portion receiving said first electric signal for outputting a voltage $V_1$ corresponding to the sum of the main signal component and a noise component included in said third split beam, a second detector portion receiving said second electric signal for outputting a voltage $V_3$ corresponding to a noise component included in said fourth split beam, and a calculation portion for calculating said signal-to-noise ratio according to $$SNR = (B_2 V_1 - a_2 V_3)/a_2 V_3$$

using said voltages $V_1$ and $V_3$ and predetermined constants $a_2$ and $b_2$.

5. An optical amplification repeating system according to claim 4, wherein said main signal blocking portion is an optical bandpass filter allowing to pass therethrough a spontaneously emitted light component having a wavelength band close to the wavelength of the signal light component amplified in said doped fiber.

6. An optical amplification repeating system according to claim 4, wherein said main signal blocking portion is an optical band-stop filter attenuating the signal light component amplified in said doped fiber.

7. An optical amplification repeating system according to claim 4, wherein said first detector portion includes a first low-pass filter supplied with said first electric signal, and said second detector portion includes a second low-pass filter supplied with said second electric signal.

8. An optical amplification repeating system having at least one optical amplifying repeater disposed in the middle of an optical transmission line connecting a first terminal station and a second terminal station comprising:

optical amplification means for amplifying an optical signal supplied thereto through said optical transmission line;

beam splitting means for splitting an output light beam of said optical amplification means into at least two split beams;

optical/electrical conversion means for converting at least one of said split beams into an electric signal;

SNR detection means for detecting a signal-to-noise ratio according to said electric signal; and monitor and control means performing predetermined controlling operations upon receipt of a supervisory control signal superposed on a main signal of said optical signal; the other of said split beams being transmitted over said optical transmission line, said amplification means including a doped fiber whose core is doped with a rare earth element connected with said optical transmission line, a pumping light source for outputting pumping light, and means for coupling said pumping light with said optical signal and introducing coupled waves into said doped fiber, said beam splitting means including a first beam splitter portion for splitting the amplified light beam by said optical amplification means into a first and a second split beam and a second beam splitter portion for splitting said first split beam into a third and a fourth split beam, said second split beam being transmitted over said optical transmission line; and a main signal blocking portion supplied with said fourth split beam for outputting said fourth split beam with a main signal component included therein blocked, wherein said optical/electrical conversion means includes a first optical/electrical converter portion for converting said third split beam into a first electric signal and a second optical/electrical converter portion for converting the light beam supplied from said main signal blocking portion into a second electric signal, and said SNR detection means includes a first detector portion receiving said first electric signal for outputting a voltage $V_2$ corresponding to the main signal component included in said third split beam, a second detector portion receiving said second electric signal for outputting a voltage $V_3$ corresponding to a noise component included in said fourth split beam, and a calculation portion for calculating said signal-to-noise ratio according to $$SNR = a_3 V_2 / b_3 V_3$$

using said voltages $V_2$ and $V_3$ predetermined constants $a_3$ and $b_3$.

9. An optical amplification repeating system according to claim 8, wherein said main signal blocking portion is an optical bandpass filter allowing to pass therethrough a spontaneously emitted light component having a wavelength band close to the wavelength of the signal light component amplified in said doped fiber.

10. An optical amplification repeating system according to claim 8, wherein said main signal blocking portion is an optical band-stop filter attenuating the signal light component amplified in said doped fiber.

11. An optical amplification repeating system according to claim 8, wherein said first detector portion includes a bandpass filter supplied with said first electric signal and an envelope detector supplied with the output of said bandpass filter, and said second detector portion includes a low-pass filter supplied with said second electric signal.

12. An optical amplification repeating system according to claim 11, wherein said bandpass filter allows to pass therethrough a signal with a frequency of amplitude modulation for automatic output level control for said optical amplifying repeater.

13. An optical amplification repeating system having at least one optical amplifying repeater disposed in the middle of an optical transmission line connecting a first terminal station and a second terminal station comprising:

optical amplification means for amplifying an optical signal supplied thereto through said optical transmission line;

beam splitting means for splitting an output light beam of said optical amplification means into at least two split beams;

optical/electrical conversion means for converting at least one of said split beams into an electric signal;

SNR detection means for detecting a signal-to-noise ratio according to said electric signal; and monitor and control means performing predetermined controlling operations upon receipt of a supervisory control signal superposed on a main signal of said optical signal; wherein:

the other of said split beams is transmitted over said optical transmission line, the main signal of said optical signal is angle modulated and said supervisory control signal is superposed on said main signal by amplitude modulation.

said beam splitting means includes a beam splitter portion for splitting the amplified light beam by said optical amplification means into a first and a second split beam, said first split beam being supplied to said optical/electrical conversion means and said second split beam being transmitted over said optical transmission line, and said SNR detection means includes a branch portion for dividing said electric signal from said optical/electrical conversion means into a first and a second branch signal, a first detector portion supplied with said first branch signal for outputting a voltage $V_2$ corresponding to a main signal component included in said first split beam, a second detector portion supplied with said second branch signal for blocking the main signal component included in said first split beam and outputting a voltage $V_4$ corresponding to a noise component included in said first split beam, and a calculation portion for calculating said signal-to-noise ratio according to $$SNR = a_4 V_2 / b_4 V_4$$

using said voltages $V_2$ and $V_4$ and predetermined constants $a_4$ and $b_4$.

14. An optical amplification repeating system according to claim 13, wherein said first detector portion includes a bandpass filter supplied with said first branch signal and a first envelope detector supplied with the output of said bandpass filter, and said second detector portion includes a band-stop filter supplied with said second branch signal and a second envelope detector supplied with the output of said band-stop filter.

15. An optical amplification repeating system according to claim 14, wherein said bandpass filter allows to pass therethrough a signal with a frequency of amplitude modulation for automatic output level control for said optical amplifying repeater, and said band-stop filter attenuates a signal with a frequency of amplitude modulation for automatic output level control for said optical amplifying repeater.

16. An optical amplification repeating system according to claim 13, wherein said first detector portion includes a bandpass filter supplied with said first branch signal and an envelope detector supplied with the output of said bandpass filter, and said second detector portion includes a low-pass filter supplied with said second branch signal and a peak-to-peak detector circuit supplied with the output of said low-pass filter.

17. An optical amplification repeating system having at least one optical amplifying repeater disposed in the middle of an optical transmission line connecting a first terminal station and a second terminal station comprising:

optical amplification means for amplifying an optical signal supplied thereto through said optical transmission line;

beam splitting means for splitting an output light beam of said optical amplification means into at least two split beams;

optical/electrical conversion means for converting at least one of said split beams into an electric signal;

SNR detection means for detecting a signal-to-noise ratio according to said electric signal;

monitor and control means performing predetermined controlling operations upon receipt of a supervisory control signal superposed on a main signal of said optical signal;

the other of said split beams being transmitted over said optical transmission line, said amplification means including a doped fiber whose core is doped with a rare earth element connected with said optical transmission line, a pumping light source for outputting pumping light, and means for coupling said pumping light with said optical signal and introducing coupled waves into said doped fiber, said beam splitting means including a first beam splitter portion for splitting the amplified light beam by said optical amplification means into a first and a second split beam; and an optical bandpass filter supplied with said second split beam for suppressing a spontaneously emitted light component generated in said doped fiber, wherein said beam splitting means further includes a second beam splitter portion for splitting the output light beam of said optical bandpass filter into a third and a fourth split beam, said fourth split beam being transmitted over said optical transmission line, said optical/electrical conversion means includes a first optical/electrical converter portion for converting said first split beam into a first electric signal and a second optical/electrical converter portion for converting said third split beam into a second electric signal, and said SNR detection means includes a first detector portion supplied with said first electric signal for outputting a voltage $V_5$ corresponding to the sum of a main signal component and a noise component included in said first split beam, a second detector portion supplied with said second electric signal for outputting a voltage $V_6$ corresponding to the sum of a main signal component and a noise component included in said third split beam and a calculation portion for calculating said signal-to-noise ratio according to $$SNR = f(V_5, V_6)$$

using said voltages $V_5$ and $V_6$ and a predetermined function f.

18. An optical amplification repeating system according to claim 17, wherein said first detector portion includes a first low-pass filter supplied with said first electric signal, and said second detector portion includes a second low-pass filter supplied with said second electric signal.

19. An optical amplification repeating system having at least one optical amplifying repeater disposed in the middle of an optical transmission line connecting a first terminal station and a second terminal station comprising:

optical amplification means for amplifying an optical signal supplied thereto through said optical transmission line;

beam splitting means for splitting an output light beam of said optical amplification means into at least two split beams;

optical/electrical conversion means for converting at least one of said split beams into an electric signal;

SNR detection means for detecting a signal-to-noise ratio according to said electric signal; and monitor and control means performing predetermined controlling operations upon receipt of a supervisory control signal superposed on a main signal of said optical signal; wherein:

the other of said split beams is transmitted over said optical transmission line, said amplification means includes a doped fiber whose core is doped with a rare earth element connected with said optical transmission line, a pumping light source for outputting pumping light, and means for coupling said pumping light with said optical signal and introducing coupled waves into said doped fiber, said beam splitting means includes a first beam splitter portion for splitting the amplified light beam by said optical amplification means into a first and a second split beam and a second beam splitter portion for separating a spontaneously emitted light generated in said doped fiber, said second split beam being transmitted over said optical transmission line, said optical/electrical conversion means includes a first optical/electrical converter portion for converting said first split beam into a first electric signal and a second optical/electrical converter portion for converting said spontaneously emitted light separated by said second beam splitter portion into a second electric signal, and said SNR detection means includes a first detector portion supplied with said first electric signal for outputting a voltage $V_2$ corresponding to a main signal component included in said first split beam, a second detector portion supplied with said second electric signal for outputting a voltage $V_7$ corresponding to a noise component included in said spontaneously emitted light, and a calculation portion for calculating said signal-to-noise ratio according to $$SNR = a_5 V_2 / b_5 V_7$$

using said voltages $V_2$ and $V_7$ and predetermined constants $a_5$ and $b_5$.

20. An optical amplification repeating system according to claim 19, wherein said first detector portion includes a bandpass filter supplied with said first electric signal and an envelope detector supplied with the output of said bandpass filter, and said second detector portion includes a low-pass filter supplied with said second electric signal.

21. An optical amplification repeating system according to claim 20, wherein said bandpass filter allows to pass therethrough a signal with a frequency of amplitude modulation for automatic output level control for said optical amplifying repeater.

* * * * *